United States Patent [19]
Jorgensen

[11] Patent Number: 5,857,581
[45] Date of Patent: Jan. 12, 1999

[54] UNIVERSAL CEILING BOX FOR EITHER FAN OR FIXTURE SUPPORT

[75] Inventor: Robert W. Jorgensen, Niles, Mich.

[73] Assignee: Hubbell Incorporated, Orange, Conn.

[21] Appl. No.: 804,263

[22] Filed: Feb. 21, 1997

[51] Int. Cl.[6] .................................................. H02G 3/08
[52] U.S. Cl. ........................................... 220/3.3; 220/3.2
[58] Field of Search ................................ 220/3.2, 3.3, 3.4

[56] References Cited

U.S. PATENT DOCUMENTS

| | | | |
|---|---|---|---|
| 3,197,548 | 7/1965 | Weitzman et al. | 220/3.3 |
| 3,575,313 | 4/1971 | Trachtenberg | 220/3.3 |
| 4,176,758 | 12/1979 | Glick | 220/3.3 |
| 4,306,109 | 12/1981 | Nattel | 220/3.2 |
| 4,315,100 | 2/1982 | Haslbeck et al. | 174/51 |
| 4,391,428 | 7/1983 | Grimes | 248/546 |
| 4,496,067 | 1/1985 | Benscoter | 220/3.3 |
| 4,580,689 | 4/1986 | Slater | 220/3.2 |
| 4,874,905 | 10/1989 | Schnell et al. | 174/65 R |
| 4,880,128 | 11/1989 | Jorgensen | 220/3.9 |
| 4,892,211 | 1/1990 | Jorgensen | 220/3.2 |
| 4,954,667 | 9/1990 | Jorgensen et al. | 174/53 |
| 5,135,411 | 8/1992 | Wiley et al. | 439/535 |
| 5,234,119 | 8/1993 | Jorgensen et al. | 272/3.9 |
| 5,407,088 | 4/1995 | Jorgensen et al. | 220/3.9 |
| 5,594,207 | 1/1997 | Fabian et al. | 220/3.3 |
| 5,680,947 | 10/1997 | Jorgensen | 220/3.2 |

*Primary Examiner*—Joseph M. Moy
*Attorney, Agent, or Firm*—Jerry M. Presson; David L. Tarnoff

[57] ABSTRACT

A universal ceiling box adapted to selectively support fans and fixtures. The ceiling box preferably has a substantially flat, top portion with a side portion extending substantially perpendicularly from the perimeter of the top portion. The side portion and the top portion form a main cavity with an open bottom end. A mounting element extends from the side portion into the main cavity for selectively coupling and supporting fans and fixtures thereto. The mounting element has a pair of opposed fan mounting holes with a first diameter, and a pair of opposed fixture mounting holes with a second diameter which is smaller than the first diameter. Each of the first and second mounting holes has an axis extending perpendicular to the top portion, respectively.

38 Claims, 9 Drawing Sheets

UNIVERSAL CEILING BOX FOR EITHER FAN OR FIXTURE SUPPORT

FIELD OF THE INVENTION

The present invention relates to a universal ceiling box for selectively supporting either a ceiling fan or a light fixture. The ceiling box has mounting members that can selectively receive fasteners for mounting a ceiling fan or fasteners for mounting a light fixture.

BACKGROUND OF THE INVENTION

Currently, many different types of electrical boxes are known in the art for use as ceiling boxes. Most of the prior art ceiling boxes have been designed either specifically for supporting ceiling fans or specifically for supporting light fixtures. In other words, different types of electrical boxes are typically used for ceiling fan support than those used for supporting light fixtures. In particular, electrical boxes for supporting ceiling fans typically use standard 10-32 screws, while electrical boxes for light fixture support use standard 8-32 screws. Moreover, Underwriters Laboratories (U.L.) has a test that electrical ceiling boxes must pass in order to be used as the sole support of a ceiling fan. Typically, a conventional electrical box used for supporting a light fixture or the like can not be used for supporting a ceiling fan.

Accordingly, when an electrical box is installed in a ceiling, the installer must determine whether a ceiling fan or a light fixture will be attached to the electrical box so that the correct type of electrical box is installed. If a light fixture type electrical box is initially installed at a particular location and then subsequently it is decided that a ceiling fan should be installed at that location, the original electrical box must typically either be modified or replaced with an electrical box which is approved for ceiling fan support.

Adapting existing light fixture boxes for use with ceiling fans is often quite difficult since light fixture boxes use smaller fasteners and are generally not strong enough to support fans without substantial reinforcements or special brackets.

If, on the other hand, an electrical box which is approved for ceiling fan support is initially installed at a particular location and then subsequently it is decided that a light fixture is to be installed at that location, the light fixture can be attached to the ceiling fan type electrical box. In other words, the National Electrical Code permits lighting fixtures to be supported by electrical boxes proved for ceiling fan support but not vice-a-versa.

However, adapting existing ceiling fan boxes for use with a light fixture or the like is not always easily accomplished, since fasteners for the light fixture are different from the fasteners use with ceiling fans. For example, fasteners used with light fixtures generally smaller in diameter than fasteners use with ceiling fans. Moreover, fixture support fasteners often come in various colors, finishes and lengths as well as with various decorative features which may be difficult, if not impossible to match, in a fastener which can be used with an electrical box approved for use with ceiling fans.

A new National Electrical Code provision (N.E.C. 370-27 (c)) has been proposed which would require that electrical boxes approved for use with ceiling fans to be installed at most locations in a building (e.g., in stairways, foyers and bathrooms). If this provision passes, than the above noted problems will be more common. This provision has been adopted in the State of Wisconsin.

Examples of prior art ceiling fan supports are disclosed in the following U.S. Pat. Nos.: 4,391,428 to Grimes; 4,880,128 to Jorgensen; 4,892,211 to Jorgensen; 5,234,119 to Jorgensen et al.; and 5,407,088 to Jorgensen et al.

Examples of prior art electrical boxes are disclosed in the following U.S. Pat. Nos.: 4,315,100 to Haslbeck et al.; 4,580,689 to Slater; 4,874,905 to Schnell et al.; 4,954,667 to Jorgensen et al.; and 5,135,411 to Wiley et al.

In view of the above noted problems, there exists a need for an electrical box approved for use with ceiling fans that can accommodate both standard light fixture fasteners as well as ceiling fan fasteners. This invention addresses this need in the prior art as well as other needs and problems which will become apparent those skilled in the art from this disclosure.

SUMMARY OF THE INVENTION

One object of this invention is to provide a ceiling box that is capable of selectively supporting either a fan or a fixture without needing to be modified.

Another object of this invention is to provide a ceiling box capable of receiving fan support fasteners as well as receiving fixture support fasteners.

Yet another object of this invention is to provide a ceiling box that meets the new U.L. test for sole support of a fan not exceeding 35 pounds in weight.

A further object of this invention is to provide ceiling boxes in various sizes, configurations, and materials that enable selective support of either a fan or a fixture.

The foregoing objects are basically attained by providing a universal ceiling box adapted to selectively support fans or light fixtures. The box having a substantially flat top portion with a perimeter; a side portion extending perpendicularly from the perimeter of the top portion, the side portion and the top portion forming a main cavity with an open end; and a mounting element extending from the side portion and extending into the main cavity. The mounting element having a pair of first opposed mounting holes with a first diameter, and a pair of second opposed mounting holes with a second diameter which is smaller than the first diameter. Each of the first and second mounting holes having an axis extending perpendicular to the top portion, respectively.

Other objects, advantages, and salient features of the invention will become apparent from the following detailed description which, taken in conjunction with the annexed drawings, discloses preferred embodiments of the invention.

BRIEF DESCRIPTION OF THE DRAWINGS

Referring to the drawings which form a part of this disclosure.

DETAILED DESCRIPTION OF PREFERRED EMBODIMENTS

Figure 1:
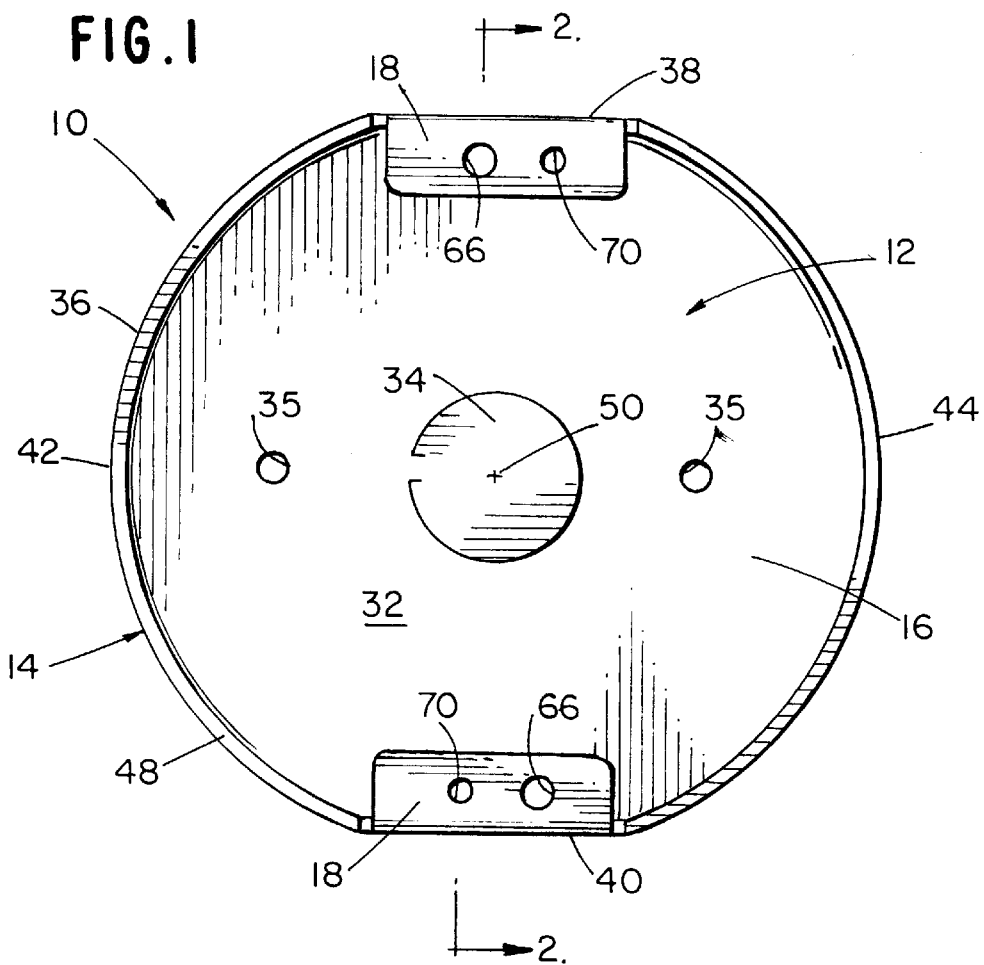
FIG. 1 is a bottom plan view of a first embodiment of a ceiling box in accordance with the present invention.
Figure 2:
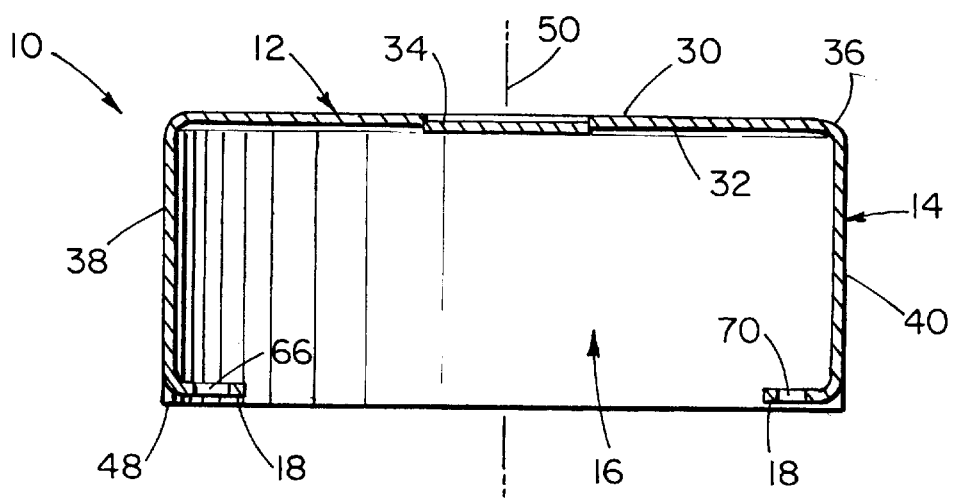
FIG. 2 is a transverse cross-sectional view of the ceiling box illustrated in FIG. 1 taken along line 2—2 of FIG. 1.

As seen in FIGS. 1 and 2, a ceiling box 10 according to a first embodiment of the present invention is illustrated, and basically includes a top portion 12 and a side portion 14 which together forms a main cavity 16 with an open bottom end. Side portion 14 has a pair of mounting members or flanges 18 which are capable of receiving both fan supporting fasteners (e.g., 10-32 screws) and fixture supporting fasteners (e.g., 8-32 screws), as discussed below. Ceiling box 10 is preferably integrally formed as a one-piece, unitary element from a substantially rigid material, such as sheet metal. Ceiling box 10 can be attached to a pair of joists or support members in a conventional manner for supporting either a fan or a fixture from a ceiling.

Top portion 12 has an upper surface 30, a lower surface 32, a centrally located breakout window 34 and a pair of support holes 35. In this embodiment, top portion 12 has a generally circular perimeter 36 with side portion 14 extending downwardly therefrom. Upper and lower surfaces 30 and 32 are preferably substantially flat and confined within perimeter 36.

Breakout window 34 is formed by stamping or punching a partial circular cut between upper and lower surfaces 30 and 32 in a conventional manner. Breakout window 34 is located in the center of top portion 12 around central axis 50 of ceiling box 10. While only one breakout window 34 is shown, ceiling box 10 may be manufactured with more breakout windows 34 on top portion 12 or side portion 14 as needed and/or desired. Breakout window 34 is selectively broken for inserting wires into ceiling box 10 for connection with wires from the fan or the fixture. Support holes 35 extend through top portion 12 for mounting ceiling box 10 to a support or the like by screws or bolts (not shown).

Side portion 14 has a first pair of opposed side sections 38 and 40 and a second pair of opposed side sections 42 and 44. Opposed side sections 38 and 40 are substantially planar and positioned adjacent flanges 18 on opposite sides of main cavity 16. Each of opposed side sections 42 and 44 extends between opposed side sections 38 and 40 in a substantially semi-circular fashion. Side sections 38, 40, 42 and 44, together, extend downwardly from the entire perimeter 36 of top portion 12. Additionally, side sections 38, 40, 42 and 44 are formed as a one-piece, unitary element with top portion 12, and extend substantially perpendicular to top portion 12 to a lower peripheral edge 48 of side portion 14.

Main cavity 16 is bounded in the upward direction by top portion 12 and 360° in the horizontal direction by side portion 14. Main cavity 16 opens in the downward direction at the lower peripheral edge 48 of side portion 14. Main cavity 16 provides an area for connection between the wires entering ceiling box 10 through breakout window 34, and the wires entering ceiling box 10 from the supported fan or fixture.

Flanges 18 are preferably substantially planar and extend substantially perpendicularly from side sections 38 and 40, respectively, into main cavity 16. Flanges 18 are coplanar with each other and are substantially parallel to top portion 12. Each flange 18 has a fan mounting hole 66 formed therein with internal threads for threadedly receiving a 10-32 screw and a fixture mounting hole 70 formed therein with internal threads for threadedly receiving an 8-32 screw. Each of the fan mounting holes 66 and each of the fixture mounting holes 70 extend completely through their respective flange 18. Mounting holes 66 and 70 have their center axes extending substantially perpendicular to their respective flanges 18.

As mentioned above, fan mounting holes 66 are threaded for receiving 10-32 threaded mounting screws, while fixture mounting holes 70 are threaded for receiving 8-32 threaded mounting screws. Alternatively, mounting holes 66 and 70 may be threaded to receive other types and sizes of fan and fixture support fasteners that comply with the new N.E.C. codes or U.L. requirements.

As seen in FIG. 1, the fan mounting holes 66 of flanges 18 are positioned approximately 3½ inches apart and have their central axes lying within a plane passing through central axis 50 of ceiling box 10. Similarly, fixture mounting holes 70 of flanges 18 are positioned approximately 3½ inches apart and have their central axes lying within a plane passing through central axis 50 of ceiling box 10. Mounting holes 66 and 70 on flanges 18 have their axes substantially parallel to central axis 50 of ceiling box 10. The arrangement of fan mounting holes 66 and fixture mounting holes 70 with respect to central axis 50 enables either the fan or the fixture to be centered with respect to ceiling box 10 when attached thereto.

Ceiling Box 10A

Figure 3:
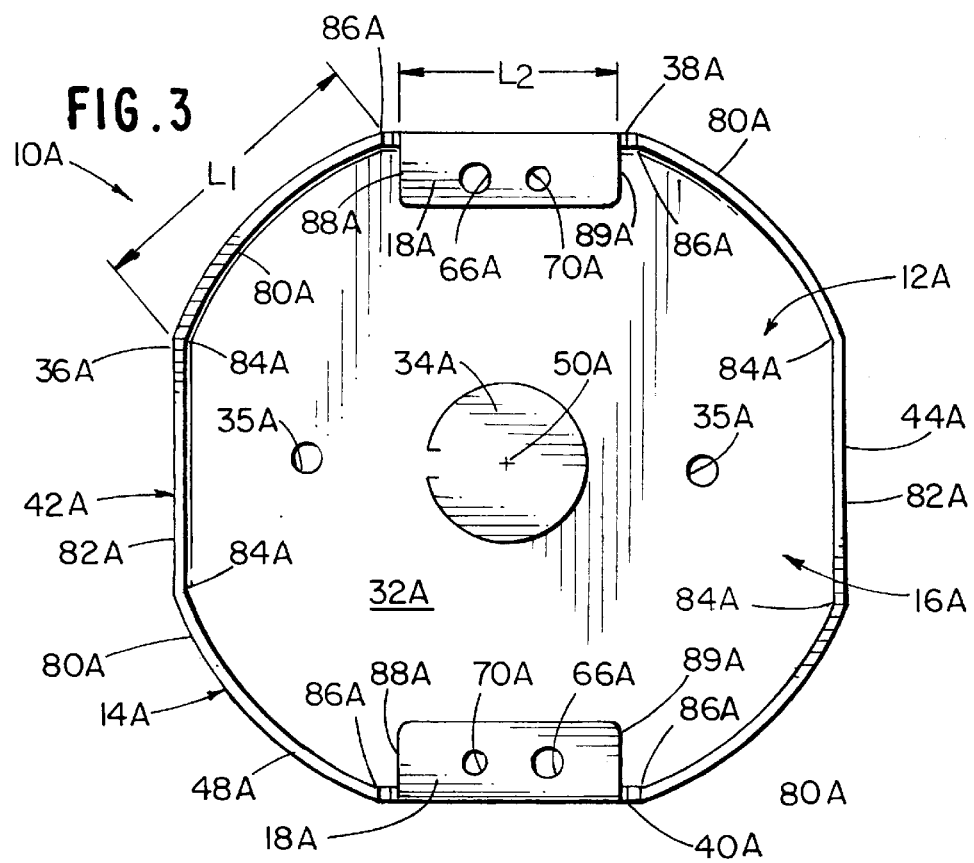
FIG. 3 is a bottom plan view of a second embodiment of a ceiling box in accordance with the present invention.

As seen in FIG. 3, ceiling box 10A according to a second embodiment of the present invention is illustrated, and basically includes a top portion 12A and a side portion 14A which together forms a main cavity 16A with an open bottom end. Side portion 14A has a pair of mounting members or flanges 18A which are capable of receiving both fan supporting fasteners (e.g., 10-32 screws) and fixture supporting fasteners (e.g., 8-32 screws).

Ceiling box 10A is substantially identical in construction to ceiling box 10, discussed above, except that side portion 14A of ceiling box 10A has been modified, as discussed below. Thus, ceiling box 10A will not be discussed in as much detail as ceiling box 10.

Top portion 12A has a lower surface 32A, a breakout window 34A, a pair of support holes 35A and a perimeter 36A. Side portion 14A has a first pair of opposed side sections 38A and 40A and a second pair of opposed side sections 42A and 44A. Each of the flanges 18A has a fan mounting hole 66A formed therein for threadedly receiving a 10-32 screw and a fixture mounting hole 70A formed therein for threadedly receiving an 8-32 screw. Accordingly, ceiling box 10A is substantially equivalent to ceiling box 10 in FIGS. 1 and 2, discussed above, except for the shape of the opposed side sections 42A and 44A.

Side sections 42A and 44A are substantially identical, and includes a pair of curved regions 80A and a planar region 82A. Curved regions 80A of side sections 42A and 44A are adjacent first and second opposed side sections 38A and 40A, respectively, while planar region 82A of each of the side sections 42A and 44A is located between curved regions 80A of its respective side section.

Each of the curved regions 80A has the same length $L_1$. Each length $L_1$ of curved regions 80A extends from a first connection point 84A between curved region 80A and planar region 82A to a second connection point 86A between curved region 80A and its adjacent side section 38A or 40A. Each of the flanges 18A has a length $L_2$ extending from a first end 88A to a second end 89A. The length $L_1$ of each curved region 80A is greater than length $L_2$ of each flange 58A and 60A. An acceptable length of $L_2$ has been determined to be approximately 1.25 inches, with the central axis of each of the fan mounting holes 66A being spaced approximately 0.50 inch from the central axis of its respective fixture mounting holes 70A positioned adjacent thereto.

Ceiling Box 10B

Figure 4:
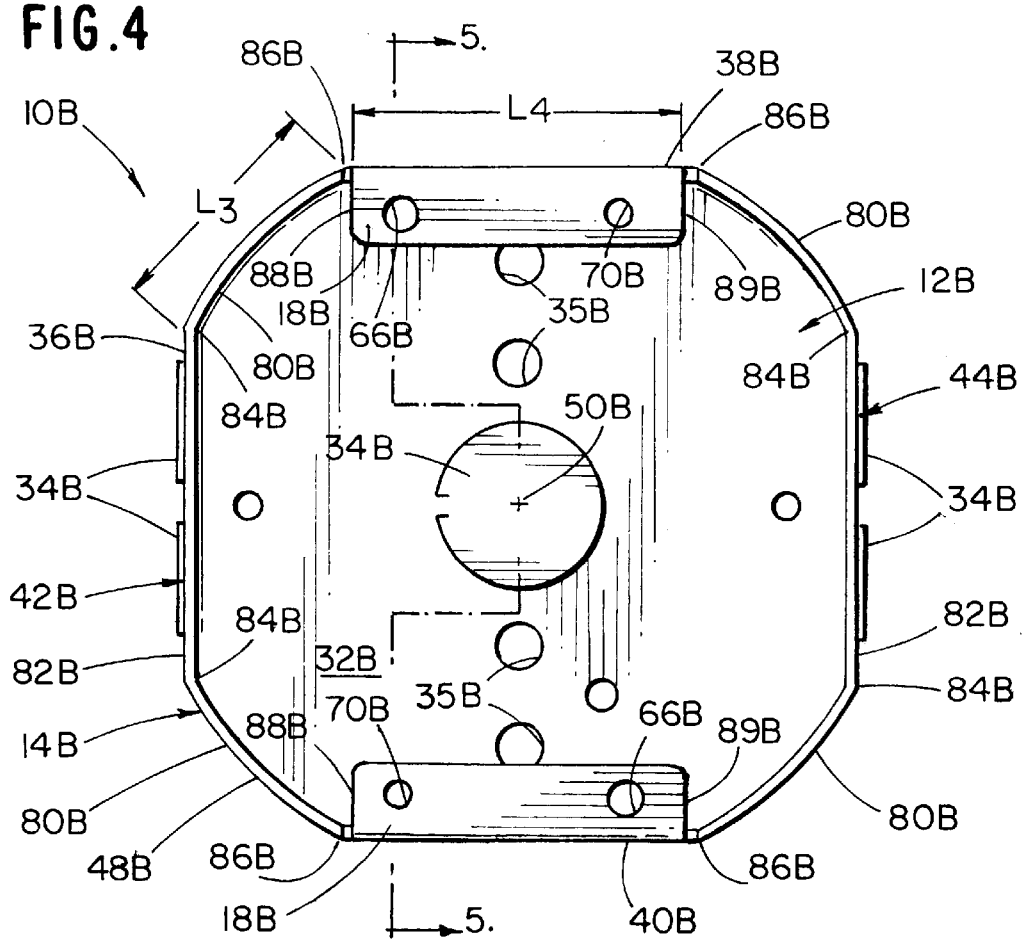
FIG. 4 is a bottom plan view of a third embodiment of a ceiling box in accordance with the present invention.
Figure 5:
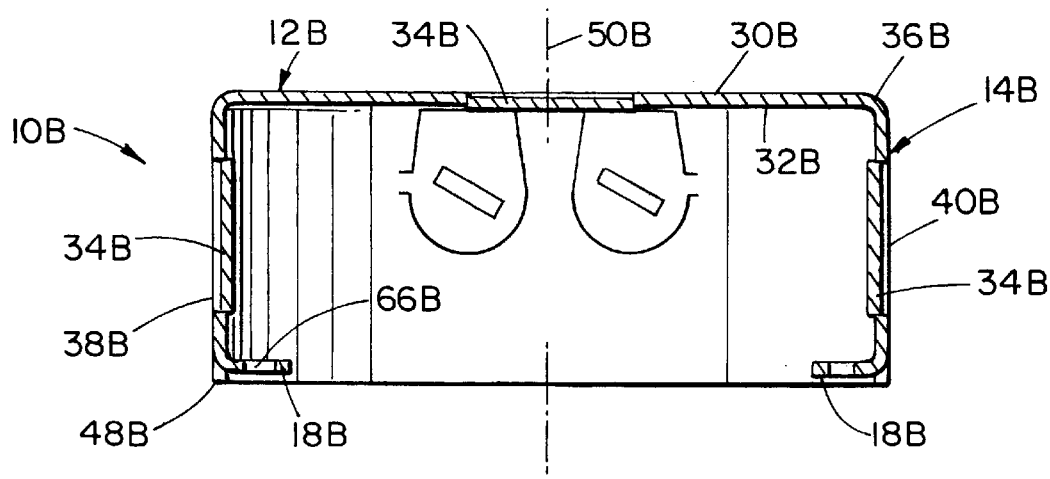
FIG. 5 is a transverse cross-sectional view of the ceiling box illustrated in FIG. 4 taken along line 5—5 of FIG. 4.

As seen in FIGS. 4 and 5, a ceiling box 10B according to a third embodiment of the present invention is illustrated, and basically includes a top portion 12B and a side portion 14B with a pair of mounting members or flanges 18B that are capable of receiving both fan supporting fasteners or fixture supporting fasteners.

Ceiling box 10B is substantially identical in construction to ceiling boxes 10 and 10A, discussed above, except that side portion 14B and flanges 18B have been slightly modified. Thus, ceiling box 10B will not be discussed in as much detail as ceiling box 10.

Top portion 12B has an upper surface 30B, a lower surface 32B, a breakout window 34B, a plurality of support holes 35B, and a perimeter 36B. Side portion 14B has four breakout windows 34B, a first pair of opposed side sections 38B and 40B, and a second pair of opposed side sections 42B and 44B. Each side section 42B and 44B includes two curved regions 80B and a planar region 82B positioned therebetween.

Each of the flanges 18B has a fan mounting hole 66B formed therein for threadedly receiving a 10-32 screw and a fixture mounting hole 70B formed therein for threadedly receiving a 8-32 screw. Accordingly, ceiling box 10B is substantially equivalent to ceiling box 10A in FIG. 3, discussed above, except that additional support holes 35B and breakout windows 34B are provided, and the modifications with respect to the lengths of curved regions 80B and flanges 18B, discussed below.

Each curved region 80B has a length $L_3$ from its connection point 84B with planar section 82B to connection point 86B with its respective side section 38B or 40B. Each of the flanges 18B has a length $L_4$ that extends from its first end 88B to its second end 89B. In the present embodiment, length $L_4$ is greater than length $L_3$. Flanges 18B are elongated to enable each fan mounting hole 66B to be spaced a greater distance from its respective fixture mounting hole 70B than in previous embodiments. In this embodiment, length $L_4$ of each flange 18B is preferably approximately 1.75 inches, with the central axis of each of the fan mounting holes 66B being spaced approximately 1.25 inches from the central axis of its respective fixture mounting hole 70B. Both fan mounting holes 66B and fixture mounting holes 70B have their central axes parallel to central axis 50B of ceiling box 10B. Moreover, the central axes of fan mounting holes 66B lie on a first plane which passes through central axis 50B of ceiling box 10B, while central axes of fixture mounting holes 70B lie on a second plane which passes through central axis 50B of ceiling box 10B. The central axes of fan mounting holes 66B are spaced approximately 3½ inches apart. Likewise, the central axes of fixture mounting holes 70B are spaced approximately 3½ inches apart.

Ceiling Box 10C

Figure 6:
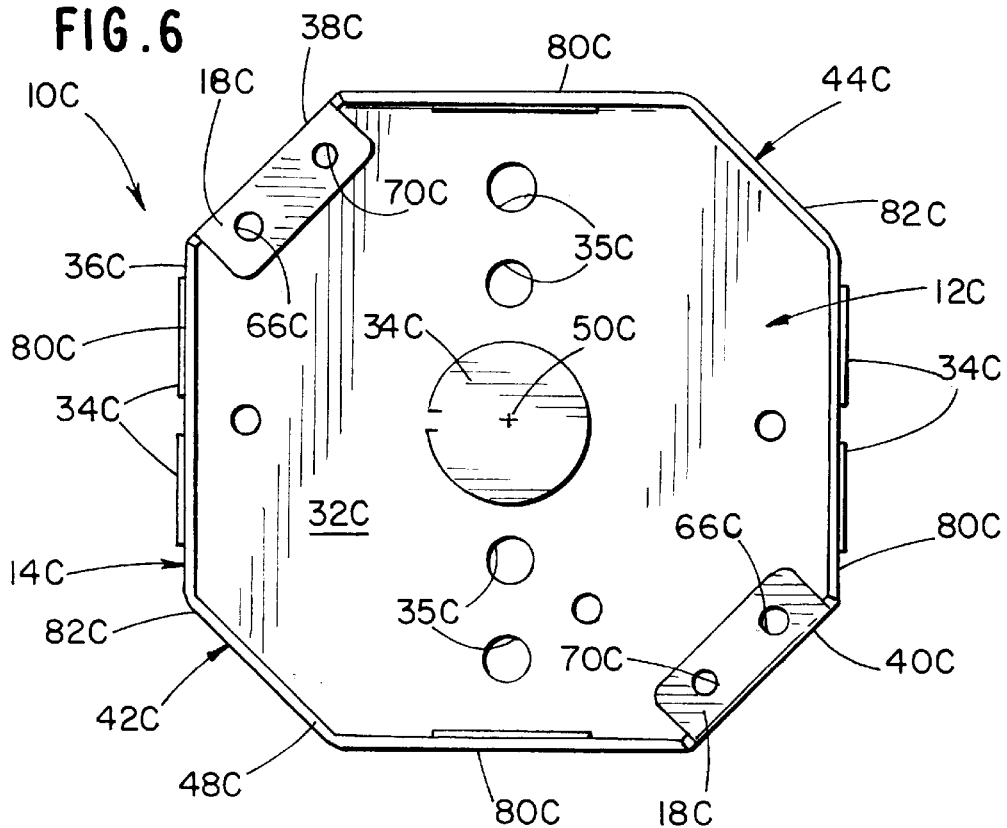
FIG. 6 is a bottom plan view of a fourth embodiment of a ceiling box in accordance with the present invention.

As seen in FIG. 6, a ceiling box 10C according to a fourth embodiment of the present invention is illustrated, and basically includes a top portion 12C and a side portion 14C with a pair of mounting members or flanges 18C that are capable of receiving both fan supporting fasteners (e.g., 10-32 screws) and fixture supporting fasteners (e.g., 8-32 screws).

Ceiling box 10C is substantially identical in construction to ceiling boxes 10, 10A and 10B, discussed above, except that side portion 14C of ceiling box 10C has been modified. Thus, ceiling box 10C will not be discussed in as much detail as ceiling box 10.

Top portion 12C has a lower surface 32C, a breakout window 34C, a plurality of support holes 35C and a perimeter 36C. Side portion 14C has six conventional breakout windows 34C for accessing ceiling box 10. Side portion 14C has basically an octagon shape when viewed in its plan view. Side portion 14C includes a first pair of opposed side sections 38C and 40C that each form one side of the octagon shape, and a second pair of opposed sections 42C and 44C that each form three sides of the octagon shape.

Each of the flanges 18C has a fan mounting hole 66C formed therein for threadedly receiving a 10-32 screw, and a fixture mounting hole 70C formed therein for threadedly receiving an 8-32 screw. Ceiling box 10C is substantially equivalent to ceiling boxes 10 and 10A, except for the shape of second pair of opposing side sections 42C and 44C.

Each side section 42C and 44C of ceiling box 10C has three planar regions. Two of the regions are formed by planar regions 80C and the third region is formed by planar region 82C. Planar regions 80c are positioned on each side of planar region 82C. In this embodiment, planar regions 80C are substantially equal in length and each larger than planar region 82C. Two planar regions 80C are adjacent to side section 38C, while the other two planar regions 80C are adjacent to side section 40C. Each shorter planar region 82C extends between two planar regions 80C. Since side section 38C and 40C are also planar, side portion 14 of ceiling box 10C forms a substantially octagonal sidewall in plan view.

Ceiling Box 10D

Figure 7:
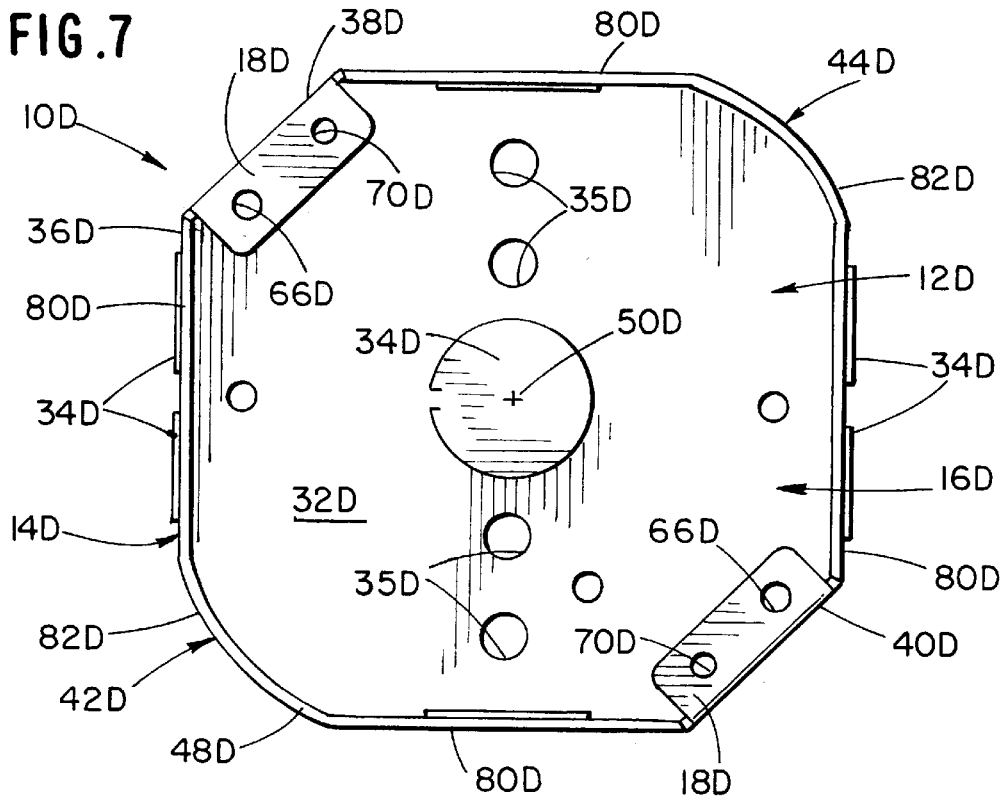
FIG. 7 is a bottom plan view of a fifth embodiment of a ceiling box in accordance with the present invention.

As seen in FIG. 7, a ceiling box 10D according to a fifth embodiment of the present invention is illustrated, and basically a top portion 12D and a side portion 14D with a pair of mounting members or flanges 18D that are capable of receiving both either fan supporting fasteners (e.g., 10-32 screws) and fixture supporting fasteners (e.g., 8-32 screws).

Ceiling box 10D is substantially identical in construction to ceiling box 10C, discussed above, except that side portion 14D of ceiling box 10D has been slightly modified. Thus, ceiling box 10D will not be discussed in as much detail as the prior ceiling boxes.

Top portion 12D has a lower surface 32D, a breakout window 34D, support holes 35D, and a perimeter 36D. Side portion 14D has a first pair of opposed side sections 38D and 40D and a second pair of opposed side sections 42D and 44D.

Each of the flanges 18D has fan mounting hole 66D formed therein for threadedly receiving a 10-32 screw and a fixture mounting hole 70D formed therein for threadedly receiving an 8-32 screw. Ceiling box 10D is substantially equivalent to ceiling box 10C except for a variation in the shape of second pair of opposing side sections 42D and 44D.

More specifically, each side section 42D and 44D is formed of two planar regions 80D and one curved region 82D therebetween. Planar regions 80D are positioned adjacent side sections 38D and 40D, respectively, while curved regions 82D extend between planar regions 80D.

Ceiling Box 110

Figure 8:
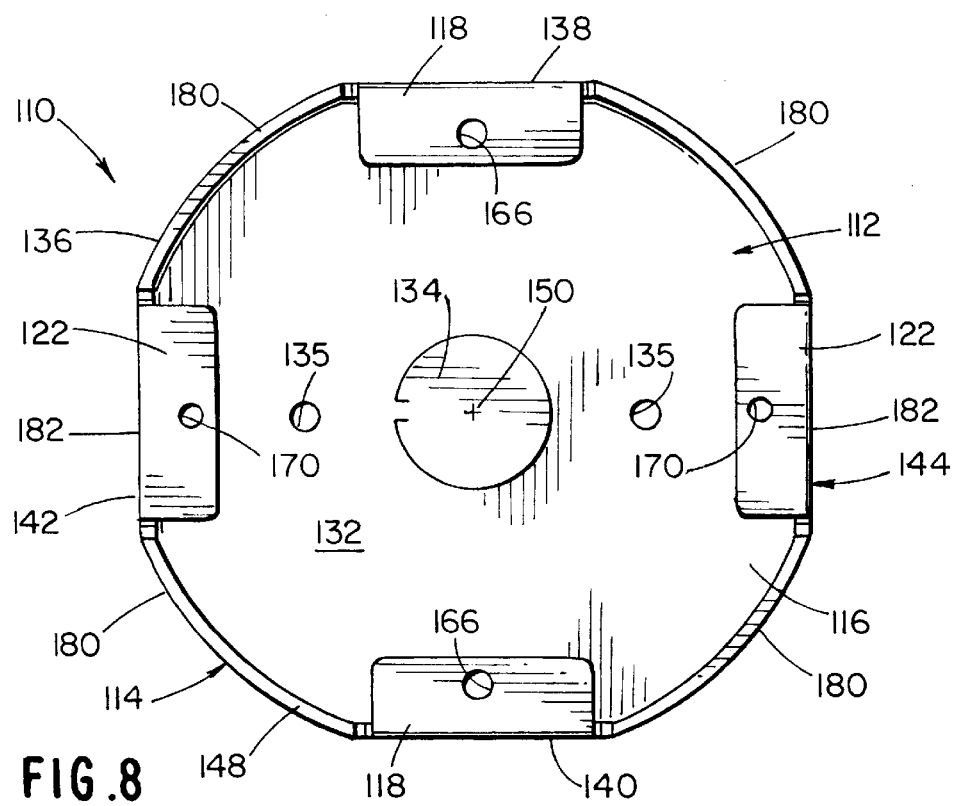
FIG. 8 is a bottom plan view of a sixth embodiment of a ceiling box in accordance with the present invention.

As seen in FIG. 8, ceiling box 110 according to a sixth embodiment of the present invention is illustrated, and basically includes a top portion 112 and a side portion 114 with a pair of fan mounting members or flanges 118 for threadedly receiving fan fasteners (e.g., 10-32 screws) to couple and support a fan thereto and a pair of fixture mounting members or flanges 122 for threadedly receiving fixture fasteners (e.g., 8-32 screws) to couple and support a fixture thereto.

Ceiling box 110 is similar in construction to ceiling box 10A, discussed above, except that ceiling box 110 has four mounting flanges 118 and 120 instead of two mounting flanges. More specifically, instead of each mounting flange having a fan mounting hole and a fixture mounting hole formed therein, ceiling box 110 has a separate mounting flange for each of the mounting holes. Thus, ceiling box 110 will not be discussed in as much detail as the prior ceiling boxes.

Top portion 112 has a lower surface 132, a breakout window 134, support holes 135, and a perimeter 136. Side portion 114 has a first pair of opposed side sections 138 and 140 and a second pair of opposed side sections 142 and 144. Each side section 142 and 144 comprises two curved regions 180 and a planar region 182 therebetween. Each of the flanges 118 has a fan mounting hole 166 formed therein for threadedly receiving a 10-32 screw and each of the flanges 122 has a fixture mounting hole 170 formed therein for threadedly receiving an 8-32 screw. Ceiling box 110 is substantially equivalent to ceiling box 10A, except for the additional flanges 122 and the location of mounting holes 166 and 170.

Mounting flanges 122 extend outwardly and substantially perpendicularly from its respective planar region 182 of side sections 142 and 144 into main cavity 116. Fan mounting holes 166 extend through flanges 118, while fixture mounting holes 170 extend through flanges 122. Mounting holes 166 and 170 have their central axes extending substantially perpendicular to their respective flanges 118 and 122. Mounting holes 166 and 170 are positioned on their respective flanges 118 and 122 such that the pair of fan mounting holes 166 are directly opposite each other and the pair of fixture mounting holes 170 are directly opposite each other. Moreover, the central axes of mounting holes 166 and 170 are parallel to central axis 150 of ceiling box 110. Moreover, the central axes of fan mounting holes 166B lie on a first plane which passes through central axis 150B of ceiling box 110B, while central axes of fixture mounting holes 170B lie on a second plane which passes through central axis 150B of ceiling box 110B. The central axes of fan mounting holes 166B are spaced approximately 3½ inches apart. Likewise, the central axes of fixture mounting holes 170B are spaced approximately 3½ inches apart. This arrangement ensures that the fan and the fixture will be centered with respect to ceiling box 110 when attached.

Ceiling Box 210

Figure 9:
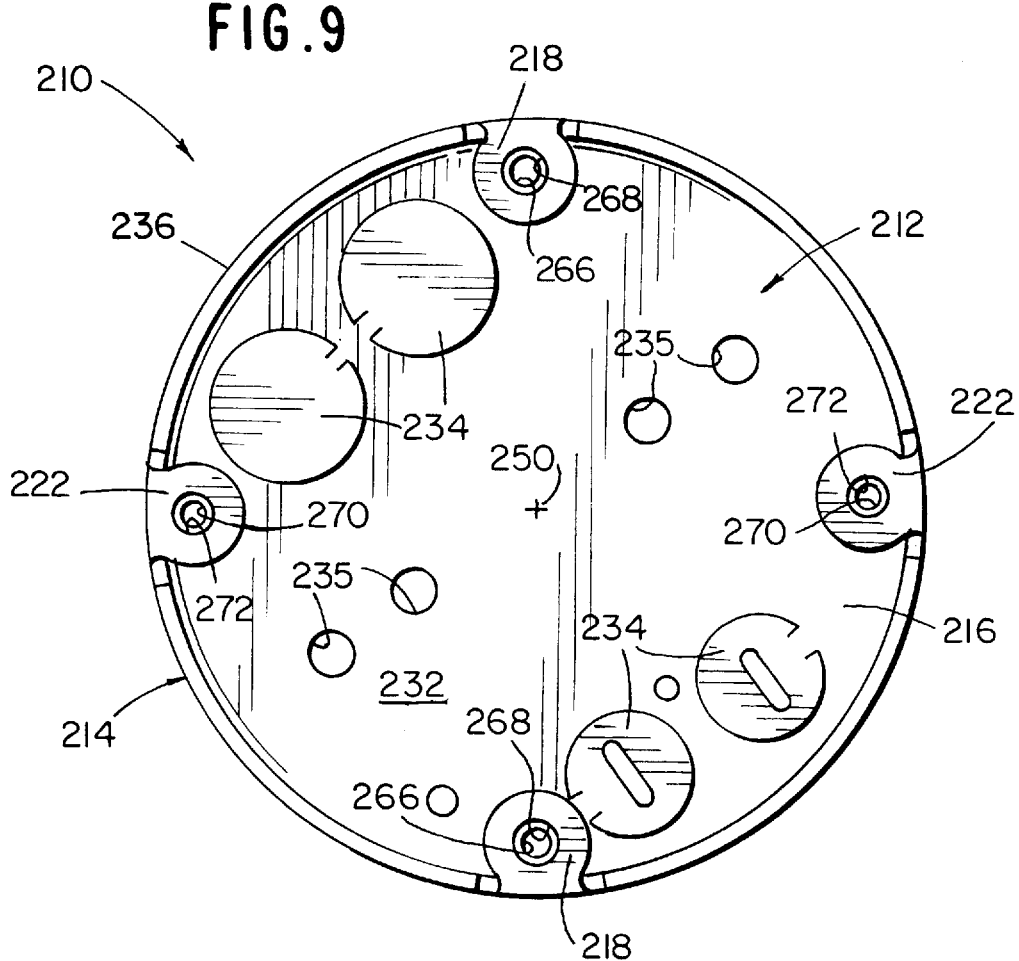
FIG. 9 is a bottom plan view of a seventh embodiment of a ceiling box in accordance with the present invention.
Figure 10:
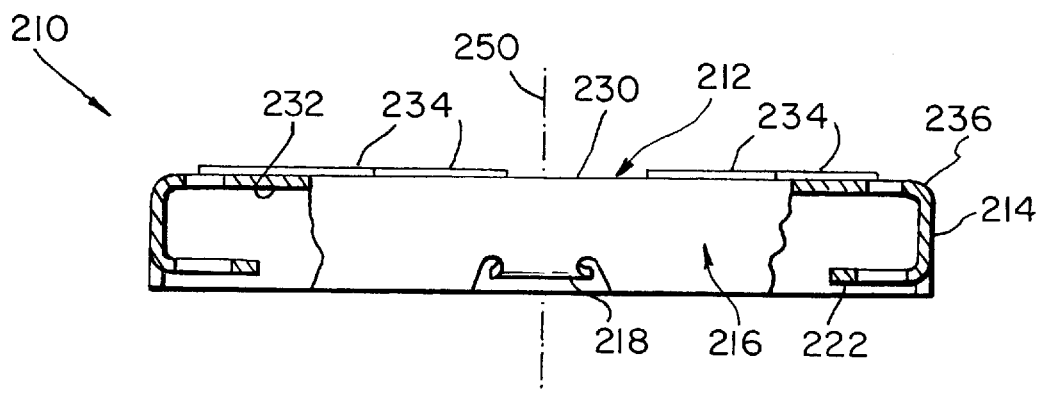
FIG. 10 is a side elevational view of the ceiling box illustrated in FIG. 9 with portions broken away for purposes of illustration.

As seen in FIGS. 9 and 10, ceiling box 210 according to a seventh embodiment of the present invention is illustrated, and basically includes a top portion 212 and a side portion 214 with four stabilizing flanges 218 and 222. In this embodiment, the fan or fixture is coupled directly to top portion 212, while flanges 218 and 222 stabilizes the mounting screws or fasteners of the fan or fixture to be attached to ceiling box 210, as discussed below.

Top portion 212 has an upper surface 230, a lower surface 232, breakout windows 234, support holes 235, and a generally circular perimeter 236. Top portion 212 also has a pair of fan mounting holes 266 extending therethrough and a pair of fixture mounting holes 270 extending therethrough. Preferably, fan mounting holes 266 are spaced approximately 180°0 apart from each other about perimeter 236, with the distance between their central axes being approximately 3½ inches. Likewise, fixture mounting holes 270 are spaced approximately 180° apart from each other about perimeter 236, with their central axes being spaced approximately 3½ inches apart.

Each of the flanges 218 has a clearance hole 268 formed therein for receiving a 10-32 screw therethrough, while each of the flanges 222 has a clearance hole 272 formed therein for receiving an 8-32 screw therethrough. While clearance holes 268 and 272 are preferably unthreaded, it will be apparent to those skilled in the art that clearance holes may be threaded to receive the appropriate screw therein.

Ceiling box 210 is similar to the ceiling box disclosed in U.S. Pat. No. 4,892,211 to Jorgensen which is hereby incorporated herein by reference. More specifically, the drawings and the portions of the specification pertaining to the structure and function of the ceiling box are incorporated herein by reference.

Ceiling box 210 differs from the ceiling box disclosed in U.S. Pat. No. 4,892,211 in that ceiling box 210 of the present invention has a pair of fixture stabilizing flanges 222 in addition to fan stabilizing flanges 218. Also, in addition to fan mounting holes 266, ceiling box 210 has fixture mounting holes 270.

Mounting holes 266 and 270 are threaded so that top portion 14 can receive both fan supporting fasteners as well as fixture supporting fasteners. Fan mounting holes 266 are threaded for receiving 10-32 threaded fan supporting fasteners, while fixture mounting holes 270 are threaded for receiving 8-32 threaded fixture supporting fasteners. Ceiling box 210 is designed to allow each mounting fastener to extend through a clearance hole 268 or 272 into a mounting hole 266 or 270 while the head of the fastener engages its respective flange 218 or 222, respectively.

Flanges 222 act in a similar manner as flanges 218 by stabilizing the mounting fasteners extending therethrough. Clearance holes 268 and 272 are aligned with and preferably larger than their respective mounting holes 266 and 270 for easily receiving their respective fasteners. Fan mounting holes 266 are positioned opposite each other, while fixture mounting holes 270 are positioned opposite each other. The central axes of mounting holes 266 and 270 are parallel to central axis 250. Moreover, the central axes of fan mounting holes 266B lie on a first plane which passes through central axis 250B of ceiling box 210B, while central axes of fixture mounting holes 270B lie on a second plane which passes through central axis 250B of ceiling box 210B. The central axes of fan mounting holes 266B are spaced approximately 3½ inches apart. Likewise, the central axes of fixture mounting holes 270B are spaced approximately 3½ inches apart. The arrangement of mounting holes 266 and 270 are such that the fan or the fixture to be attached thereto will be centered with respect to ceiling box 210, when selectively attached thereto.

Ceiling Box 310

Figure 11:
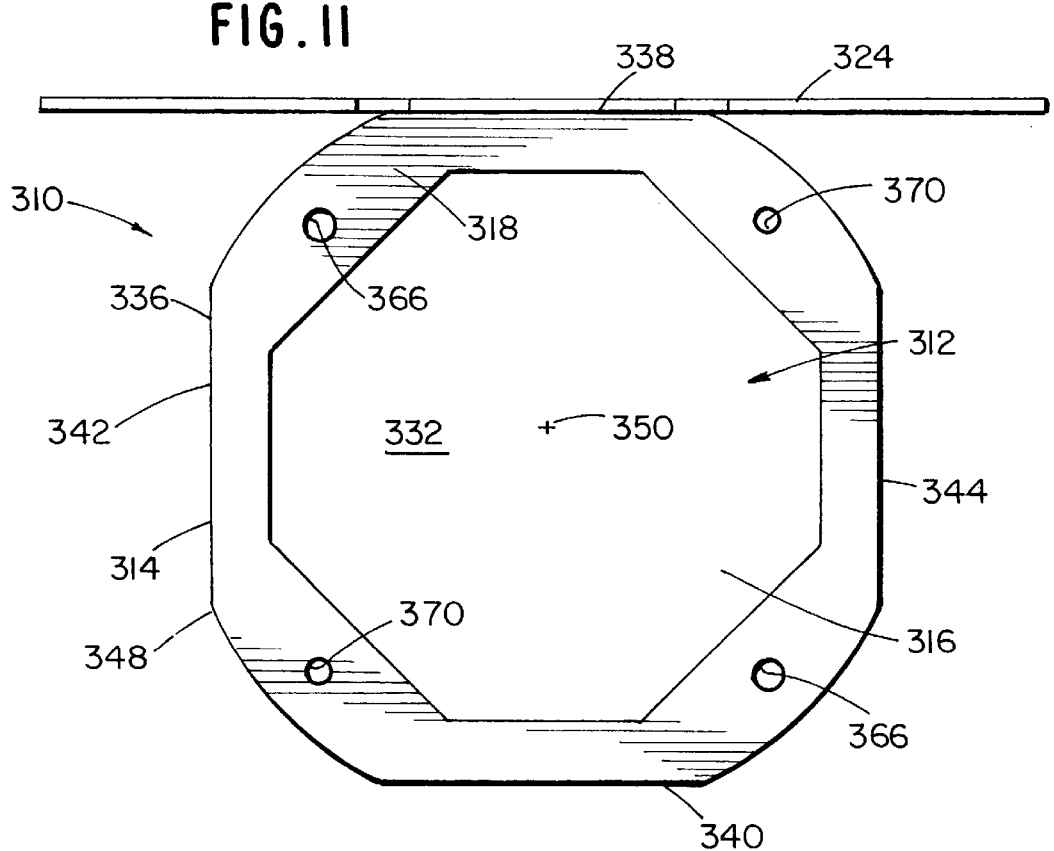
FIG. 11 is a bottom plan view of an eighth embodiment of a ceiling box in accordance with the present invention.
Figure 12:
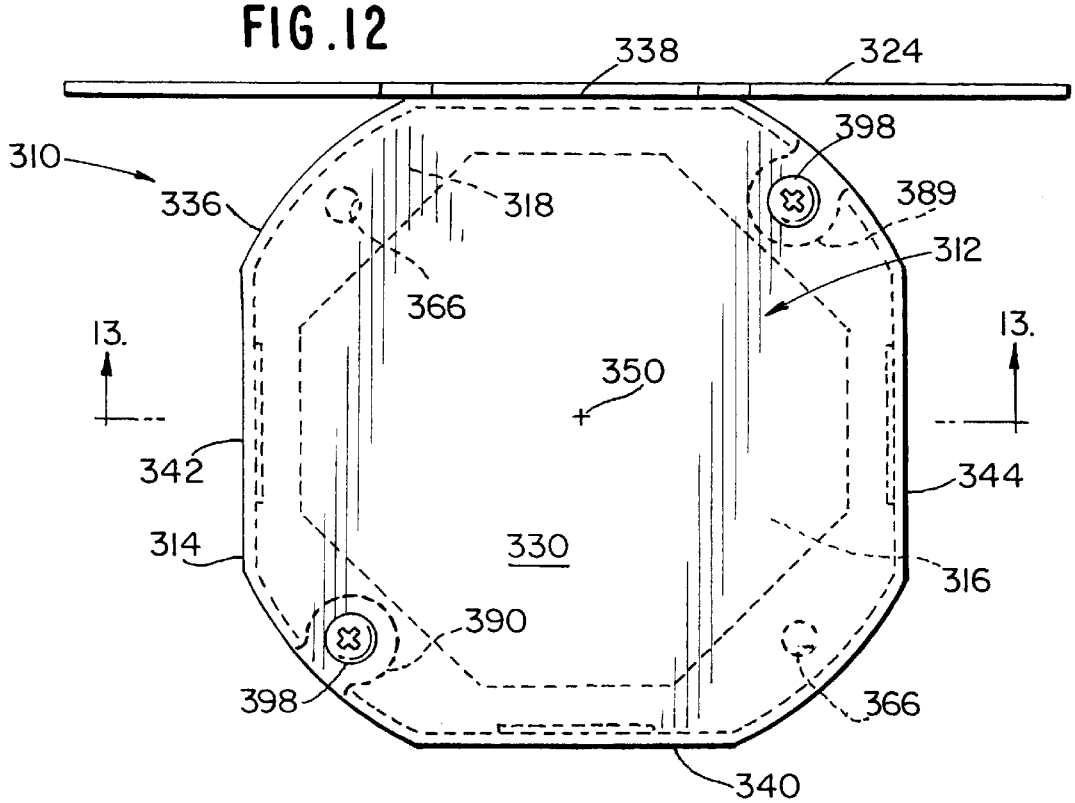
FIG. 12 is a top plan view of the ceiling box illustrated in FIG. 11.
Figure 13:
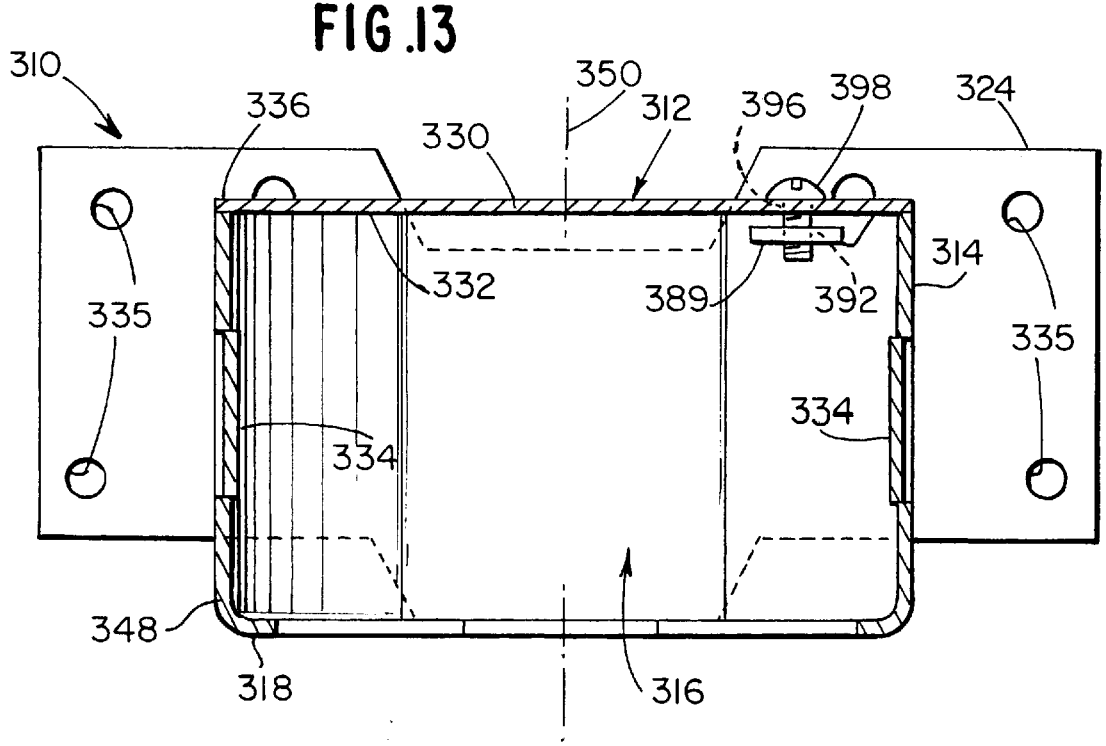
FIG. 13 is a cross-sectional view of the ceiling box illustrated in FIGS. 11 and 12 taken along line 13—13 of FIG. 12.

As seen in FIGS. 11–13, ceiling box 310 according to an eighth embodiment of the present invention is illustrated, and basically includes a top portion 312 and a side portion 314 with a single mounting member or flange 318 that is capable of receiving both fan supporting fasteners (e.g., 10-32 screws) and fixture supporting fasteners (e.g., 8-32 screws).

Top portion 312 has an upper surface 330, a lower surface 332, apertures 396 and a perimeter 336. Side portion 314 has a plurality of breakout windows 334, a first pair of opposed side sections 338 and 340, a second pair of opposed side sections 342 and 344, and fastening members or flanges 389 and 390. Ceiling box 310 has a bracket 324 coupled along side section 338 for attachment to a support via support holes 335. Ceiling box 10 is preferably constructed of sheet metal.

Ceiling box 310 is similar to the ceiling box for ceiling fan support disclosed in U.S. Pat. No. 4,880,128 to Jorgensen, except for the manner of attachment of top portion 312 to side portion 314, and the mounting holes 370 and 372 for attaching the fixture support fasteners to flange 318 as described below. U.S. Pat. No. 4,880,128 to Jorgensen is hereby incorporated herein by reference. Specifically, the drawings and the portions of the specification pertaining to the structure and function of the ceiling box is incorporated herein by reference.

Fastening flanges 389 and 390 extend perpendicularly from side portion 314 and are formed as an integral, one-piece element with side portion 314 and with continuous flange 318. Since each fastening flange 389 and 390 and its connection with top portion 312 is identical, only fastening flange 389 and its connection with top portion 312 will be described in detail. Fastening flange 389 has a threaded opening 392 extending therethrough. Threaded opening 392 has an axis that is perpendicular to fastening flanges 389. Aperture 396 in top portion 312 is an unthreaded clearance aperture extending through top portion 312, and is aligned axially with threaded openings 392.

Fastening element or screw 398 is received by aperture 396 and by opening 392 for securing top portion 312 to side portion 314.

Although top portion 312 has been described as being connected to side portion 314 through the use of screws 398, top portion 312 may be fastened to side portion 314 by other fastening devices, such as welding, along perimeter 336.

Flange 318 is a continuous member with a substantially octagonal inner surface forming the opening for ceiling box 310. Additionally, flange 318 is preferably integrally formed as a one-piece element with side portion 314 and extends perpendicularly therefrom into main cavity 316. Flange 318 has a pair of opposing fan mounting holes 366 and a pair of opposing fixture mounting holes 370 extending therethrough. Fan mounting holes 366 are threaded for receiving 10-32 threaded fan supporting fasteners, while fixture mounting holes 370 and 372 are threaded for receiving 8-32 threaded fixture supporting fasteners.

Ceiling Box 410

Figure 14:
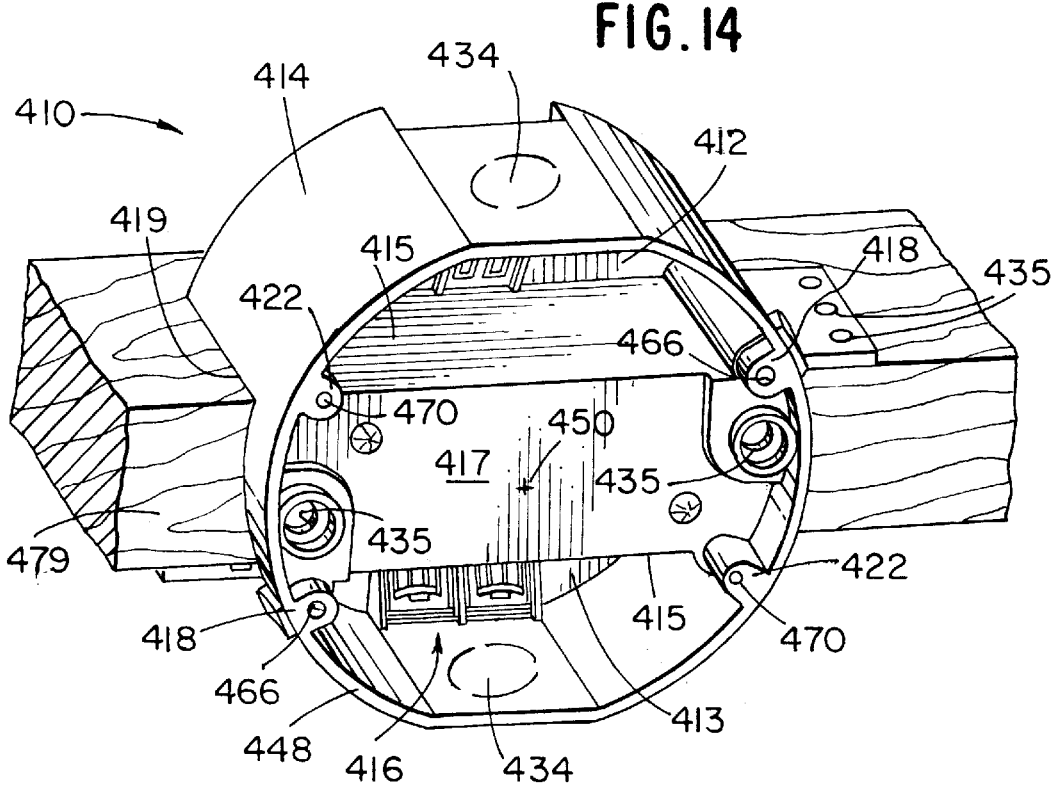
FIG. 14 is a perspective view of a ninth embodiment of a ceiling box in accordance with the present invention.
Figure 15:
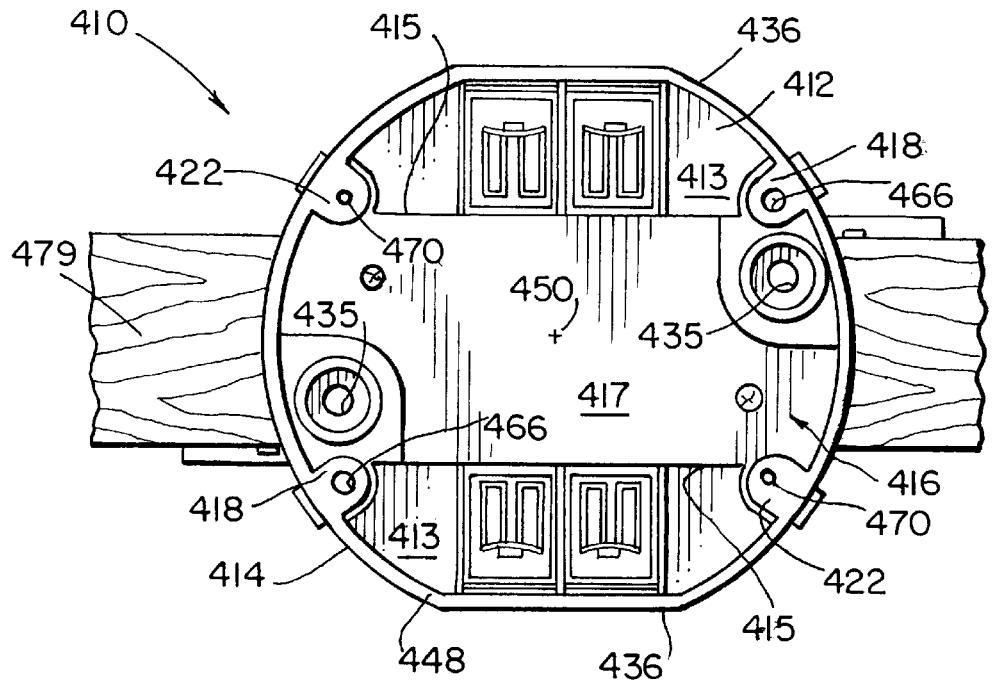
FIG. 15 is a bottom plan view of the ceiling box illustrated in FIG. 14.

As seen in FIGS. 14 and 15, a plastic ceiling box 410 according to a ninth embodiment of the present invention is illustrated, and basically includes a top portion 412 and a side portion 414 which together forms a main cavity 416. Side portion 414 has a pair of fan mounting members 418 for receiving fan supporting fasteners (e.g., 10-32 screws) and a pair of fixture mounting members 422 for receiving fixture supporting fasteners (e.g., 8-32 screws).

Ceiling box 410 is substantially equivalent to the plastic box for ceiling fixture support disclosed in U.S. Pat. No. 5,407,088 to Jorgensen et al., except that the ceiling box has been modified to receive two different sizes of fasteners as described below. U.S. Pat. No. 5,407,088 to Jorgensen et al. is hereby incorporated herein by reference. Specifically, the drawings and the portions of the specification pertaining to the structure and function of the plastic box are incorporated herein by reference.

Preferably, ceiling box 410 is formed as a one-piece, unitary, integrally molded member from a suitable non-metallic material, such as a thermoplastic or thermoset composition, which is preferably substantially rigid, i.e., not readily flexible. Examples of such thermoplastic materials are polyphenylene oxides and polybutylene terephthalate, and an example of such a thermoset material is phenolec resin. Preferably, ceiling box 410 is formed of a polyester such as VALOX 358.

Top portion 412 is contoured for engaging a joist or support member. In particular, top portion 412 includes a pair of top walls 413, a pair of sidewalls 415 and a lower wall 417. Lower wall 417 is substantially rectangular and planar. Lower wall 417 is coupled to opposed side walls 415 which extend perpendicularly upward from lower wall 417 to top walls 413. Sidewalls 415 are substantially planar and parallel to each other. The lower wall 417 and sidewalls 415 defined a joist receiving recess 419, which is preferably rectangular in cross-section. Preferably, joist receiving recess 419 is sized to snugly receive a ceiling joist 479. Accordingly, when the ceiling box 410 is fitted around a ceiling joist 479, the ceiling box 410 will not rotate, slide, or rock back and forth.

It will be readily understood by those skilled in the art that the ceiling fan 410 can be constructed specifically to fit a specific size of ceiling joist. This invention can also be adapted to fit ceiling joists that are not rectangular in cross-section by shaping the lower wall 417 and sidewalls 415, accordingly. Ceiling box 410 is coupled to joist 479 by fasteners (not shown) extending through support holes 435 of lower wall 417 and into joist 479.

Fan mounting members 418 are positioned on opposite sides of recess 478, as well as on opposite sides of ceiling box 410. Fan mounting holes 466 are formed in fan mounting members 418 for threadedly receiving a fan screw or the like. Fixture mounting members 420 are also positioned on opposite sides of recess 478 as well as being on opposite sides of ceiling box 410. Fixture mounting holes 470 are located in opposing mounting members 422 for threadedly receiving a fixture screw or the like.

Fan mounting holes 466 are preferably threaded or sized for threadedly receiving 10-32 threaded fan supporting fasteners, while fixture mounting holes 470 are preferably threaded or sized for threadedly receiving 8-32 threaded fixture supporting fasteners. The 10-32 threaded fasteners received by fan mounting holes 468 and 470 can be screws made of metal or, alternatively, they can be made of plastic if the application and/or code permits. Screws suitable for plastic are PLASTITE screws.

Ceiling Box 510

Figure 16:
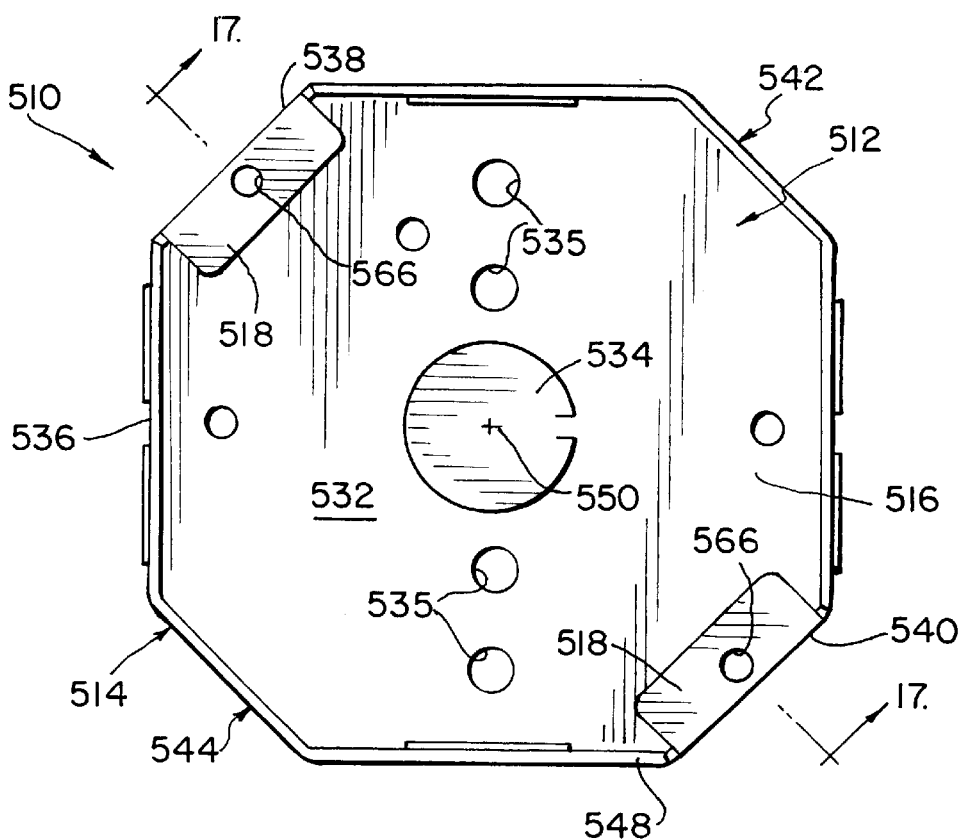
FIG. 16 is a bottom plan view of a tenth embodiment of a ceiling box in accordance with the present invention.
Figure 17:
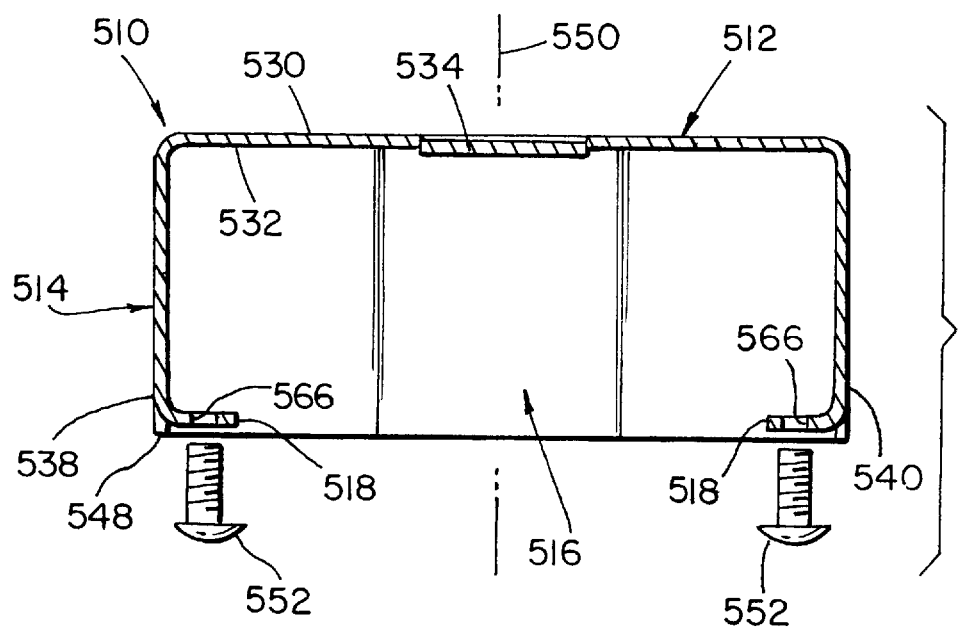
FIG. 17 is a cross-sectional view of the ceiling box illustrated in FIG. 16 taken along line 17—17 of FIG. 16.

As seen in FIGS. 16 and 17, ceiling box 510 according to a tenth embodiment of the present invention is illustrated, and basically includes a top portion 512, a side portion 514, a main cavity 516, and a pair of mounting members or flanges 518 that selectively receive either fan supporting fasteners or fixture supporting fasteners.

Top portion 512 has an upper surface 530, a lower surface 532, a breakout window 534, support holes 535, and a perimeter 536. Side portion 514 has breakout windows 534, a first pair of opposed side sections 538 and 540 and a second pair of opposed side sections 542 and 544. Each flange 518 has a mounting hole 566 formed therein. Ceiling box 510 is substantially equivalent to ceiling box 10C except for flanges 518 having only one hole 566 extending therethrough, as discussed below.

Mounting holes 566 extend completely through flanges 518, and are preferably unthreaded. In particular, mounting holes 566 are unthreaded so they can receive self-tapping screws 552. Screws 552 are screws made from steel and are case hardened such that they are capable of cutting their own threads in flanges 518 and 520 when inserted into holes 566 and 568, respectively. Screws 552 and 553 are 8-32 threaded screws, but since they cut their own threads in flanges 518, a tighter connection is made with flanges 518. This connection allows screws 552 or other similar screws to be used to support ceiling fans as well as light fixtures directly on electrical box 510.

In operation, holes 566 are threaded by screws 552 and selectively support either the ceiling fan or the light fixture. If it is necessary to use the screws specifically associated with the light fixture in ceiling box 510, 8-32 threads may be formed within holes 566 by screws 552. After removing screws 552 from mounting holes 566, each of mounting holes 566 will have 8-32 threads, and can then receive the 8-32 threaded screws specifically associated with the light fixture.

While various advantageous embodiments have been chosen to illustrate the invention, it will be understood by those skilled in the art that various changes and modifications can be made herein without departing from the scope of the invention as defined in the appended claims.

What is claimed is:

1. A universal ceiling box adapted to selectively support fans and fixtures, comprising:
   a substantially flat top portion having a perimeter;
   a side portion extending substantially perpendicularly from said perimeter of said top portion, said side portion and said top portion forming a main cavity with an open end; and
   a mounting element extending from said side portion and extending into said main cavity, said mounting element having a pair of first opposed mounting holes with a first diameter, and a pair of second opposed mounting holes with a second diameter which is smaller than said first diameter, each of said first and second mounting holes having an axis extending perpendicular to said top portion, respectively, and the axes of said first and second mounting holes each are disposed at substantially the same distance from a central axis of the ceiling box;
   each of said first pair of mounting holes having a diameter compatible with a 10-32 screw for supporting a fan, and each of said second pair of mounting holes having a diameter compatible with a 8-32 screw for supporting a fixture.

2. A universal ceiling box according to claim 1, wherein said mounting element further comprises first and second flanges, each of said flanges having one of said first and second mounting holes formed therein.

3. A ceiling box according to claim 2, wherein said first and second mounting holes are threaded to receive their respective screws.

4. A universal ceiling box according to claim 3, wherein said flanges and said side portion are integrally connected to form a one-piece, unitary member.

5. A universal ceiling box according to claim 4, wherein said side portion has first and second opposed side sections, and third and fourth opposed side sections, each of said third and fourth side sections extends between said first side section and said second side section, and said first flange extends from said first side section and said second flange extends from said second side section.

6. A universal ceiling box according to claim 5, wherein said third and fourth side sections are substantially semi-circular.

7. A universal ceiling box according to claim 5, wherein each of said third and fourth side sections comprises two curved regions and a substantially straight region.

8. A universal ceiling box according to claim 7, wherein said first and second flanges have a length, each of said curved regions have a length, and said length of said first and second flanges is less than said length of said curved regions.

9. A universal ceiling box according to claim 7, wherein said first and second flanges have a length, each of said curved regions have a length, and said length of said first and second flanges is greater than said length of said curved regions.

10. A universal ceiling box according to claim 4, wherein said side portion of said box has a substantially octagonal shape.

11. A universal ceiling box according to claim 5, wherein said third and fourth side sections each comprise two substantially straight regions and a curved region extending between said straight regions.

12. A universal ceiling box according to claim 1, wherein said mounting element comprises first, second, third, and fourth flanges spaced apart from each other and consecutively arranged around said side portion,
   one of said first pair of mounting holes extend through each of said first and second flanges, and
   one of said second pair of mounting holes extend through each of said third and fourth flanges.

13. A universal ceiling box according to claim 12, wherein said first and second pairs of mounting holes are threaded to receive a fastener.

14. A universal ceiling box according to claim 13, wherein said flanges and said side portion are integral to form a one-piece, unitary member.

15. A universal ceiling box according to claim 1, wherein said side portion has a periphery; and said mounting element comprises a single continuous flange extending around the entire said periphery, and said first and second pairs of mounting holes extend through said flange.

16. A universal ceiling box according to claim 15, wherein one of said first and second pairs of mounting holes is separated from the other mounting hole of said first and second pairs of mounting holes by said main cavity.

17. A universal ceiling box according to claim 16, wherein said first and second pairs of mounting holes are threaded to receive their respective screws.

18. A universal ceiling box according to claim 17, wherein said side portion further has multiple fastening members extending perpendicularly to said side portion and extending into said main cavity, said multiple fastening members, said side portion, and said flange being integrally connected to form a one-piece, unitary member.

19. A universal ceiling box according to claim 18, wherein each said multiple fastening members have a threaded opening extending through said fastening member for receiving a fastening element, and said top portion has multiple apertures extending therethrough, each of said multiple apertures being aligned with one of said threaded openings, respectively, to receive fastening elements for securing the top portion to said side portion.

20. A universal ceiling box according to claim 19, further comprising a bracket attached to said side portion for mounting said box to a support.

21. A universal ceiling box according to claim 1, wherein said mounting element further comprises first, second, third, and fourth mounting members spaced apart from each other and consecutively arranged around said side portion and extending into said main cavity, one of said first pair of mounting holes extends into each of said first and second mounting members, and one of said second pair of mounting holes extends into each of said third and fourth mounting members, said top portion, said side portion, and said pairs of fastening members all being formed of a substantially rigid plastic.

22. A universal ceiling box according to claim 21, wherein said top portion, said side portion and said pairs of fastening members are formed from plastic as a one-piece, unitary, integrally molded member.

23. A universal ceiling box according to claim 22, wherein each of said mounting hole is adapted to threadedly receive a mounting fastener.

24. A universal ceiling box according to claim 23, further comprising first and second substantially planar opposed side walls extending perpendicularly from said top portion into said main cavity; and a substantially planar lower wall extending between and perpendicularly to said first and second side walls defining a recess sized to snugly receive a structural member.

25. A universal ceiling box as claimed in claim 1, wherein portions of said mounting element defining said first and second pairs of mounting holes therein lie within substantially the same plane.

26. A universal ceiling box adapted to support either a fan or a fixture comprising:

a substantially flat top portion having a perimeter;

a side portion extending perpendicularly from said top portion along said perimeter of said top portion, said side portion and said top portion partially enclosing a main cavity; and mounting means for receiving a fastener, said mounting means comprising first and second pairs of mounting holes, said first pair of mounting holes having a first diameter and a second pair of mounting holes having a second diameter that is smaller than said first diameter, each hole of said first and second pairs of mounting holes having an axis extending perpendicularly to said top portion, respectively, and the axes of said first and second mounting holes each are disposed at substantially the same distance from a central axis of the ceiling box;

said first diameter of each of said first pair of mounting holes being compatible with a 10-32 screw for supporting a fan, and said second diameter of each of said second pair of mounting holes being compatible with a 8-32 screw for supporting a fixture.

27. A universal ceiling box according to claim 26, wherein said mounting means further comprises first and second opposing flanges, said first flange being separated from said second flange by said main cavity, one hole of each of said first and second pairs of mounting holes extends through said first flange, and another hole of each of said first and second pairs of mounting holes extends through said second flange.

28. A universal ceiling box according to claim 27, wherein said first and second pairs of mounting holes are threaded.

29. A universal ceiling box according to claim 26, wherein said mounting means further comprises first and second flanges separated by said main cavity and third and fourth flanges separated by said main cavity, one of said first pair of mounting holes extends through said first flange and another of said first pair of mounting holes extends through said second flange, and one of said second pair of mounting holes extends through said third flange and another of said second pair of mounting holes extends through said fourth flange.

30. A universal ceiling box according to claim 26, wherein said first and second pairs of mounting holes extend through said top portion.

31. A universal ceiling box according to claim 30, wherein said mounting means further comprises first and second pairs of flanges extending perpendicularly from said side portion and extending into said main cavity, each of said first pair of flanges having a first aperture extending therethrough, and each of said second pair of flanges having a second aperture extending therethrough, each of said first pair of mounting holes being aligned axially with one of said first apertures, respectively, and each of said second pair of mounting holes being aligned axially with one of said second apertures.

32. A universal ceiling box according to claim 31, wherein said first and second pairs of mounting holes are threaded to receive their respective screws.

33. A universal ceiling box according to claim 26, wherein said side portion has a periphery; and said mounting means further comprises a single continuous flange extending around the entire said periphery of said side portion, said first and second pairs of mounting holes located on and extending through said flange, one hole of each of said first and second pairs of mounting holes is separated from another hole of each of said first and second pairs of mounting holes by said main cavity.

34. A universal ceiling box according to claim 33, wherein said first and second pairs of mounting holes are threaded.

35. A universal ceiling box according to claim 26, wherein said mounting means further comprises first and second pairs of mounting members extending perpendicularly from said side portion and extending into said main cavity, each of said first pair of mounting members having one of said first pair of mounting holes extending therein, and each of said second pair of members having one of said second pair of mounting holes extending therein;

said top portion, said side portion, and said mounting means all being formed of a substantially rigid plastic.

36. A universal ceiling box according to claim 35, wherein said top portion, said side portion and said mounting means are formed as a one-piece, unitary, integrally molded member.

37. A universal ceiling box according to claim 36, wherein said first and second pairs of mounting holes are threaded.

38. A universal ceiling box as claimed in claim 28, wherein portions of said mounting means defining said first and second pairs of mounting holes therein lie within substantially the same plane.

* * * * *